Figure 1:
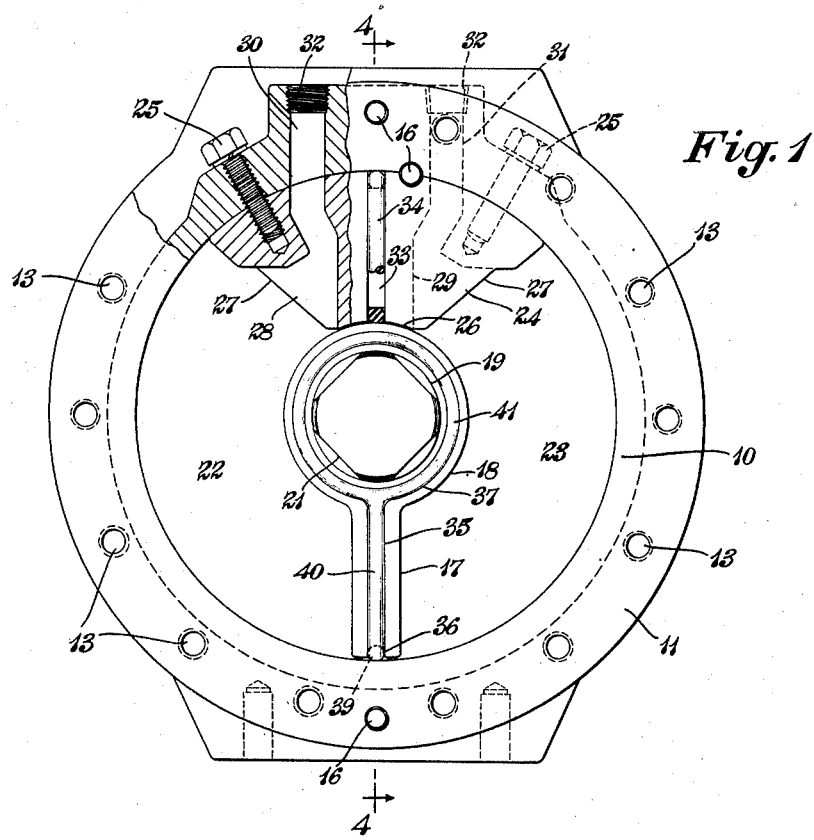

Feb. 6, 1951　　　C. L. MOUSHEY ET AL　　　2,540,903
RUBBER SEAL FOR HYDRAULIC MOTORS
Filed July 30, 1949　　　　　　　　　　　　　　2 Sheets-Sheet 1

INVENTORS
Charles L. Moushey and
BY John Carl Hall
Frease and Bishop
ATTORNEYS

Feb. 6, 1951   C. L. MOUSHEY ET AL   2,540,903
RUBBER SEAL FOR HYDRAULIC MOTORS
Filed July 30, 1949   2 Sheets-Sheet 2

INVENTORS
Charles L. Moushey and
John Carl Hall
BY
ATTORNEYS

Patented Feb. 6, 1951

2,540,903

UNITED STATES PATENT OFFICE 2,540,903

RUBBER SEAL FOR HYDRAULIC MOTORS

Charles L. Moushey, Mount Vernon, and John Carl Hall, Orrville, Ohio, assignors to Hydromotor, Incorporated, Orrville, Ohio, a corporation of Ohio Application July 30, 1949, Serial No. 107,708

2 Claims. (Cl. 121—97)

The invention relates to fluid seals for preventing leakage of fluid in hydraulic motors, and more particularly to a novel construction of rubber seal for preventing fluid leakage from one pressure chamber to another in the type of hydraulic motor in which a piston oscillates within a cylinder having a substantially radial barrier therein.

In hydraulic motors of the character referred to the piston is in the form of a radially disposed vane or impeller mounted upon an axial shaft in the cylinder, a stationary barrier in the cylinder terminating adjacent to the shaft and limiting movement of the impeller in both directions. The piston is moved within the cylinder by means of fluid pressure applied to one side or the other of the piston.

Due to the necessary mechanical clearance between the outer edge of the piston and the cylinder wall, and between the inner edge of the stationary barrier and the shaft, as well as around the journals of the shaft, fluid pressure will tend to equalize between the chambers formed by the piston and the cylinder wall, by leaking through these clearances.

In order to reduce such leakage of fluid it is present practice to provide spring loaded pressure plates located in grooves in the edges of the piston for contact with the stationary parts of the motor, and to provide packing rings around the journals of the shaft. Such seals are not only expensive, but are unsatisfactory due to high friction losses, since it is necessary to have a high initial friction between the members even when no pressure is applied to the piston.

It is an object of the present invention to overcome the above disadvantages by providing a simple, inexpensive and efficient oil resisting, synthetic rubber seal to prevent fluid leakage between the movable member and stationary parts of a hydraulic motor.

Another object is to provide such a seal including a substantially U-shape, synthetic rubber sealing member located in grooves in the side and outer edges of the piston and integral rings, at the ends of the legs of the U-shape sealing member, for location within grooves in the journal portion of the shaft.

A further object is to provide a seal of the character referred to including a substantially rectangular, continuous ring of synthetic rubber located in aligned grooves in the inner and outer and side edges of the stationary barrier.

Figures 2, 3:
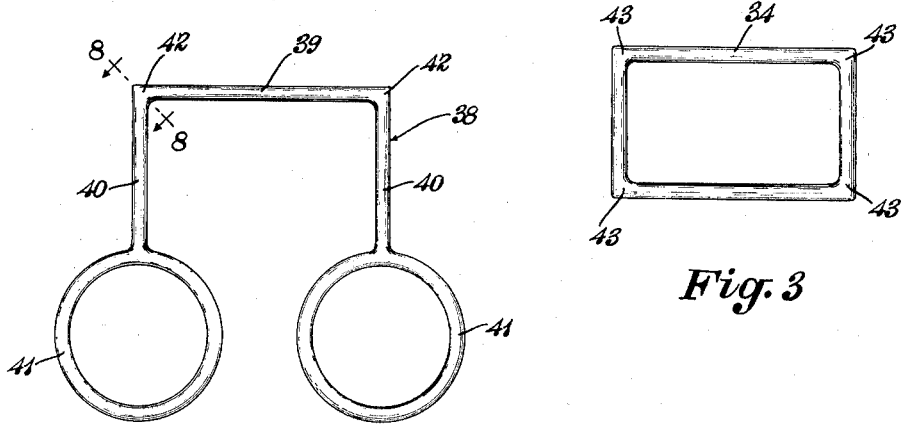
Figure 4:
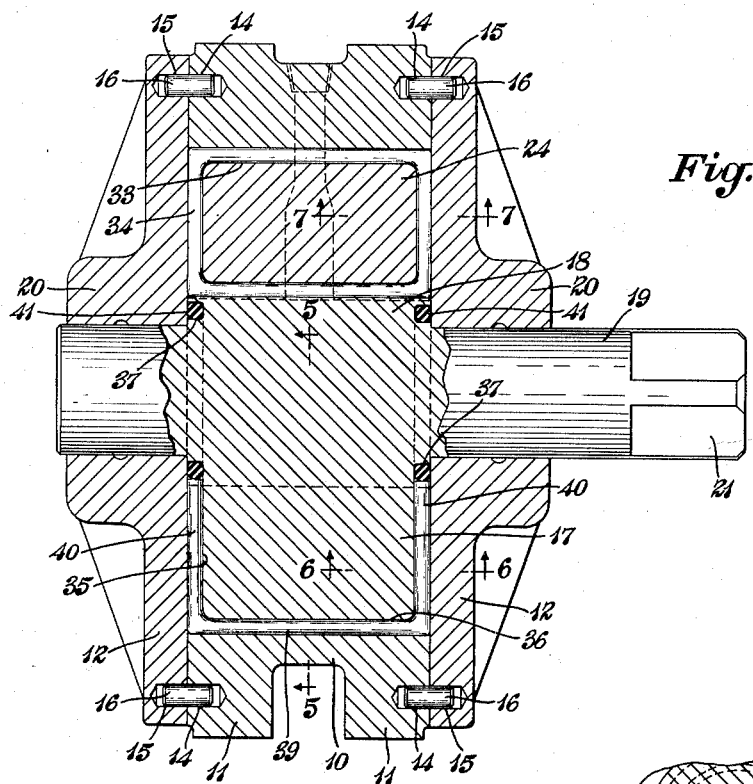
Figure 6:
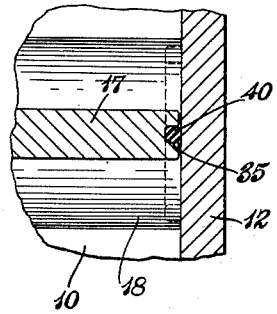
Figure 5:
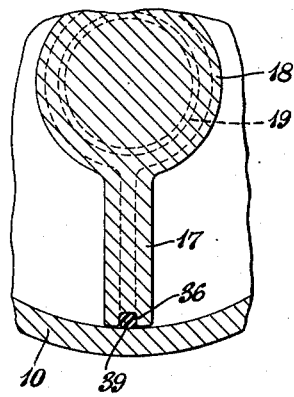
Figure 7:
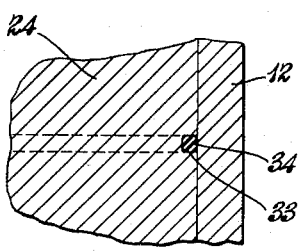

The above objects together with others which will be apparent from the drawings and following description, or which may be later referred to, may be attained by constructing the improved seal in the manner hereinafter described in detail and illustrated in the accompanying drawings, in which;

Figure 1 is a front elevation of a hydraulic motor provided with the improved seal, parts being broken away for the purpose of illustration;

Fig. 2 a detached elevation of the improved seal for the piston and shaft journals;

Fig. 3 a similar view of the seal for the stationary barrier;

Fig. 4 a transverse sectional view through the motor, taken on the line 4—4, Fig. 1;

Fig. 5 a fragmentary sectional view taken on the line 5—5, Fig. 4;

Fig. 6 a fragmentary sectional view taken on the line 6—6, Fig. 4;

Fig. 7 a fragmentary sectional view taken on the line 7—7, Fig. 4; and

Figure 8:
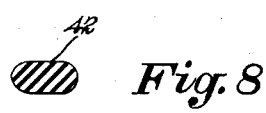

Fig. 8 a section on the line 8—8, Fig. 2.

Referring now more particularly to the construction illustrated in the drawings, in which similar numerals refer to similar parts throughout, a hydraulic motor of the character referred to is illustrated, comprising a cylinder or casing 10 having a peripheral flange 11 at each end to which the heads or end plates 12 are attached in any conventional manner, as by screws (not shown), which may be located through suitable apertures in the heads and threaded into the tapped openings 13 in the flanges 11 of the cylinder or casing.

For the purpose of properly locating the heads or end plates 12 upon the cylinder or casing 10, registering sockets 14 and 15 may be provided in the flanges 11 of the cylinder and the peripheral portions of the heads respectively to receive the dowel pins 16.

The piston is in the form of a vane or blade 17 integrally formed upon, or rigidly connected to, the enlarged portion 18 of the shaft 19, which is axially located through the cylinder and journalled in the bearing bosses 20 formed upon the heads or end plates. One end of the shaft 19 may be squared, as indicated at 21, to provide for connection to the part which it is desired to rotate by means of the motor.

The cylinder is divided into two chambers 22 and 23, as indicated in Fig. 1, by means of the piston and the stationary barrier 24 which latter is rigidly attached to the cylinder walls as by screws 25. The inner end of the stationary barrier 24 is arcuate, as indicated at 26, conforming to the curvature of the enlarged portion 18 of the shaft, there being a slight clearance between the barrier and the enlarged portion of the shaft, as best shown in Fig. 1, and the sides of the stationary barrier are preferably inclined toward the center of the cylinder as indicated at 27.

Hydraulic fluid may be selectively admitted to and withdrawn from the chambers 22 and 23 through conduits 28 and 29 respectively in the stationary barrier communicating with conduits 30 and 31 respectively in the cylinder wall, said last named conduits being internally screw threaded as indicated at 32 for the connection of suitable pipes or tubes through which the hydraulic fluid is admitted and discharged.

Because of the mechanical clearance between the shaft and the stationary barrier, as indicated at 26, as well as a similar clearance between the outer edge and side edges of the piston and the cylinder walls and heads respectively, fluid under pressure tends to equalize between the chambers 22 and 23 by leaking through these clearances.

It has been customary under present practice to provide spring loaded pressure plates at these points and to provide packing rings around the journals of the shaft. The present invention contemplates the elimination of these spring loaded pressure plates and packing rings by the use of oil resisting synthetic rubber sealing means as hereinafter described.

In order to provide a seal between the stationary barrier 24 and the enlarged portion 18 of the shaft, as well as to provide a fluid tight seal between the stationary barrier and the cylinder walls and heads or end plates, the stationary barrier may be provided at its central portion with a continuous groove 33 in which groove is located the continuous, rectangular sealing ring 34, formed of oil resisting synthetic rubber.

This sealing ring is placed in the groove 33 of the stationary barrier before the barrier is mounted within the cylinder. This ring is preferably round in cross section, as shown in the drawings, and when the screws 25 are tightened to connect the stationary barrier to the inside of the cylinder and the heads or end plates are screwed upon the cylinder, the portions of this sealing ring located between the stationary barrier and the cylinder walls and heads will be compressed or distorted so as to provide a liquid tight joint preventing leakage between the chambers 22 and 23 at these points.

The inner portion of the ring 34 will be slightly compressed, or distorted, by contact with the enlarged portion 18 of the shaft, as best shown in Fig. 1, forming a liquid tight seal and preventing leakage of fluid from one chamber to the other at this point.

In order to prevent leakage of fluid from one chamber to the other, between the piston and cylinder walls and heads, a second seal is provided. For this purpose the side edges and outer edge of the vanes 17 of the piston are provided with communicating grooves 35 and 36 respectively, the grooves 35 communicating at their inner ends with annular grooves 37 in opposite ends of the enlarged portion 18 of the shaft for receiving the sealing member indicated generally at 38 in Fig. 2.

This sealing member comprises a substantially U-shape portion having the straight central bar 39, fitting in the groove 36 in the outer edge of the vane 17, and the straight legs 40 fitting in the grooves 35 in the side edges of the vane 17, a circular ring 41 being formed at the end of each leg and fitting in the circular groove 37 in the ends of the enlarged portion 18 of the shaft.

This sealing member 38 is preferably molded flat, as shown in Fig. 2, in order to simplify the molding process, and the rings 41 are turned at 90 degrees for applying the sealing member to the piston as shown in the drawings. This sealing member may be of substantially round cross sectional shape, excepting at the corners 42 where it is preferably of oval cross sectional shape as indicated in Fig. 8.

The corners 43 of the rectangular sealing member 34 may also if desired be of this same cross sectional shape. This round cross sectional sealing member 38 is slightly compressed or distorted when positioned in the hydraulic motor, as indicated in the drawings, forming a liquid tight seal which prevents leakage between the chambers 22 and 23 through the clearance between the piston and the cylinder walls and heads.

With this construction a simple and efficient seal is provided for preventing leakage of liquid from one chamber of the hydraulic motor to the other without the necessity of using spring loaded pressure plates, packing rings and the like as in ordinary practice.

We claim:

1. In a hydraulic motor comprising a casing including end walls forming a cylinder, a shaft located axially through the cylinder, a piston vane mounted on the shaft, disposed axially between the end walls and radially to one side of the shaft, a barrier extending axially between the end walls and radially between the shaft and the axially extending wall of the cylinder, said barrier having a continuous groove of substantially square cross section in its outer, inner and side faces, sealing means including a substantially rectangular, continuous ring of oil resisting, synthetic rubber located in said groove and contacting the shaft and the axially extending wall and end walls of the cylinder, said ring being of substantially round cross section throughout the greater portion of its length and of substantially elliptic cross section at its corners, and being compressed and distorted within said groove.

2. In a hydraulic motor comprising a casing including end walls forming a cylinder, a shaft located axially through the cylinder and having an enlarged portion extending between said end walls, there being an annular groove in each end of said enlarged portion of the shaft, a piston vane mounted on the shaft, disposed axially between the end walls and radially to one side of the shaft and having a groove in its outer and side edges, a barrier extending axially between the end walls and radially between the shaft and the axially extending wall of the cylinder, said barrier having a continuous groove in its outer, inner and side faces, sealing means including a substantially U-shape member of oil resisting synthetic rubber located in said groove in the piston vane, integral, continuous rings at the ends of the U-shape member located in said annular grooves in the ends of the enlarged portion of the shaft and contacting the end walls, the U-shape member contacting the axially extending wall and the end walls of the cylinder, and a substantially rectangular continuous ring of oil resisting synthetic rubber located in the groove in the barrier and contacting the shaft and the axially extending wall and end walls of the cylinder.

CHARLES L. MOUSHEY.
JOHN CARL HALL.

REFERENCES CITED

The following references are of record in the file of this patent:

UNITED STATES PATENTS

| Number | Name | Date |
|---|---|---|
| 280,710 | Baker | July 3, 1883 |
| 917,092 | Miller et al. | Apr. 6, 1909 |
| 1,001,634 | Rainalter | Aug. 29, 1911 |
| 1,113,155 | Espy | Oct. 6, 1914 |
| 2,419,651 | Magrum | Apr. 29, 1947 |